Jan. 18, 1955   J. W. GARDNER   2,699,806
MACHINE FOR SLITTING THE SKINS OF NUTS
Filed April 10, 1951   3 Sheets-Sheet 1

INVENTOR.
JAMES W. GARDNER
BY
Kenway, Jenney, Witter & Hildreth
ATTORNEYS

Jan. 18, 1955  J. W. GARDNER  2,699,806
MACHINE FOR SLITTING THE SKINS OF NUTS
Filed April 10, 1951  3 Sheets-Sheet 2

INVENTOR.
JAMES W. GARDNER
BY
Conway, Tenney, Witter & Hildreth
ATTORNEYS

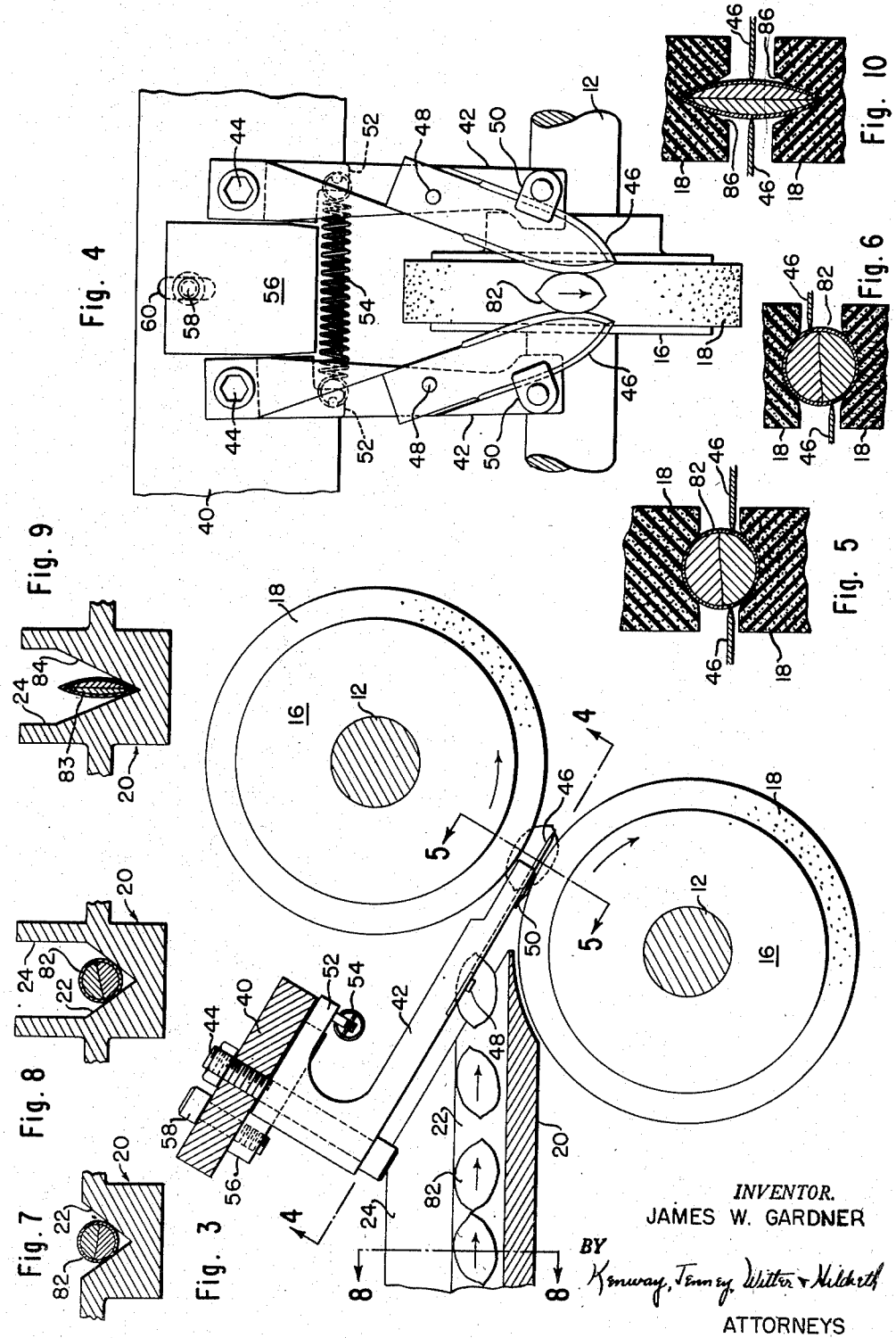

United States Patent Office 2,699,806
Patented Jan. 18, 1955

2,699,806

MACHINE FOR SLITTING THE SKINS OF NUTS

James W. Gardner, Tyrone, Pa.

Application April 10, 1951, Serial No. 220,165

5 Claims. (Cl. 146—32)

This invention relates to an improved machine for slitting the skins of nuts to permit easy removal of the skins without breaking the nuts. Skins have heretofore been slitted along one side only of the nuts for this purpose and my invention provides for an easier and more efficient removal of the skins by slitting them along lines extending substantially around the nuts. The production of an improved machine for this purpose comprises the primary object of the invention.

In accordance with my invention the nuts are arranged in parallel rows and fed to opposed wheels or other moving surfaces which engage opposite faces of the nuts and pass them through gaps between the opposed surfaces. Two opposed skin slitting knives are disposed at each gap in position to engage and slit the nuts as they pass through the gaps and while they are held by and between the two surfaces. The production of an improved machine of this nature comprises a further object of the invention.

These and other features of the invention will be best understood and appreciated from the following description of preferred embodiments thereof selected for purposes of illustration and shown in the accompanying drawing in which—

Fig. 3 is an enlarged sectional view taken on line 3—3 of Fig. 2,

Fig. 4 is a view taken on line 4—4 of Fig. 3,

Fig. 5 is an enlarged fragmentary view taken on line 5—5 of Fig. 3,

Fig. 6 is a like view slightly modified,

Fig. 7 is an enlarged sectional view taken on line 7—7 of Fig. 2,

Fig. 8 is a like view taken on line 8—8 of Fig. 3,

Fig. 9 is a like view of a modified construction, and

Fig. 10 is a view similar to Fig. 5 but showing a modified construction.

Figure 1:
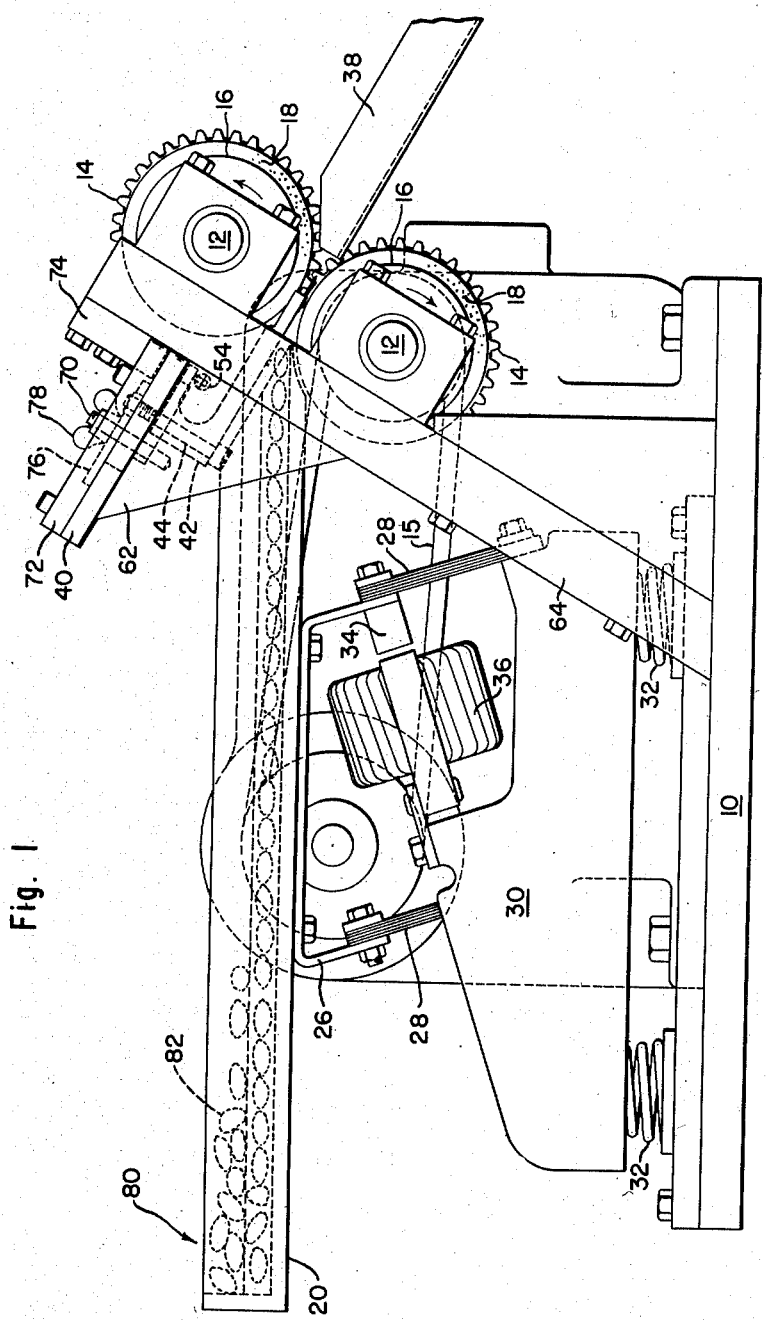
Fig. 1 is a side elevation of a nut slitting machine embodying my invention.

In the drawings, 10 indicates a frame on one end of which is rotatably mounted two shafts 12. The shafts are rotatably connected by gears 14 and are driven in the direction of the arrows by a belt 15. Mounted in spaced relation on and along the shafts are a series of pairs of wheels 16 each provided with an annular cushion 18 of sponge rubber or the like at its periphery.

Mounted on the frame forwardly of the shafts 12 is a nut supporting hopper 20 provided with a series of parallel V-shaped troughs 22 therein in alignment with and extending substantially to the bite between the cooperating pairs of wheels 16. A series of baffles 24 are provided between the troughs adjacent to the wheels for the purpose of arranging nuts in rows and feeding them to the wheels. The hopper is mounted on brackets 26 each supported at its two ends on leaf springs 28 supported on a block 30. The block is supported on springs 32 resting on the base of the frame 10.

An armature 34 carried by a bracket 26 cooperates with an electromagnet 36 supported on the block 30. Electromagnetic vibration of the armature by the magnet is adapted to vibrate the hopper longitudinally at high speed and thereby dispose the nuts into the troughs and feed them to the wheels 16. The V-shaped troughs automatically arrange the nuts in end to end relation and from the ends of the troughs they are engaged by and between the opposed cushions 18 of the adjacent pairs of wheels and passed through the gaps therebetween. From the wheels the nuts are fed to an inclined exit trough 38.

Mounted on the bottom face of a bar 40 are a series of pairs of arms 42 each pivoted to bolts 44 on the bar and extending laterally to one side of the bar. Supported on the free ends of each pair of arms is a pair of knives 46 with opposed cutting edges. Each blade engages over a pin 48 on its arm and is supported at its forward end beneath a clip 50. The blades can be quickly removed and replaced as is frequently required when the blades become dull. The arms are provided with parallel portions 52 and these portions of each pair of arms are connected by a tension spring 54 adapted to pull the arms toward each other. This inward movement of the arms is limited by a block 56 mounted on the bar between each pair of arms. A bolt 58 extending through a slot 60 in the bar and threaded into the block supports the block on the bar and the slot permits adjustment of the block transversely of the bar.

Figure 2:
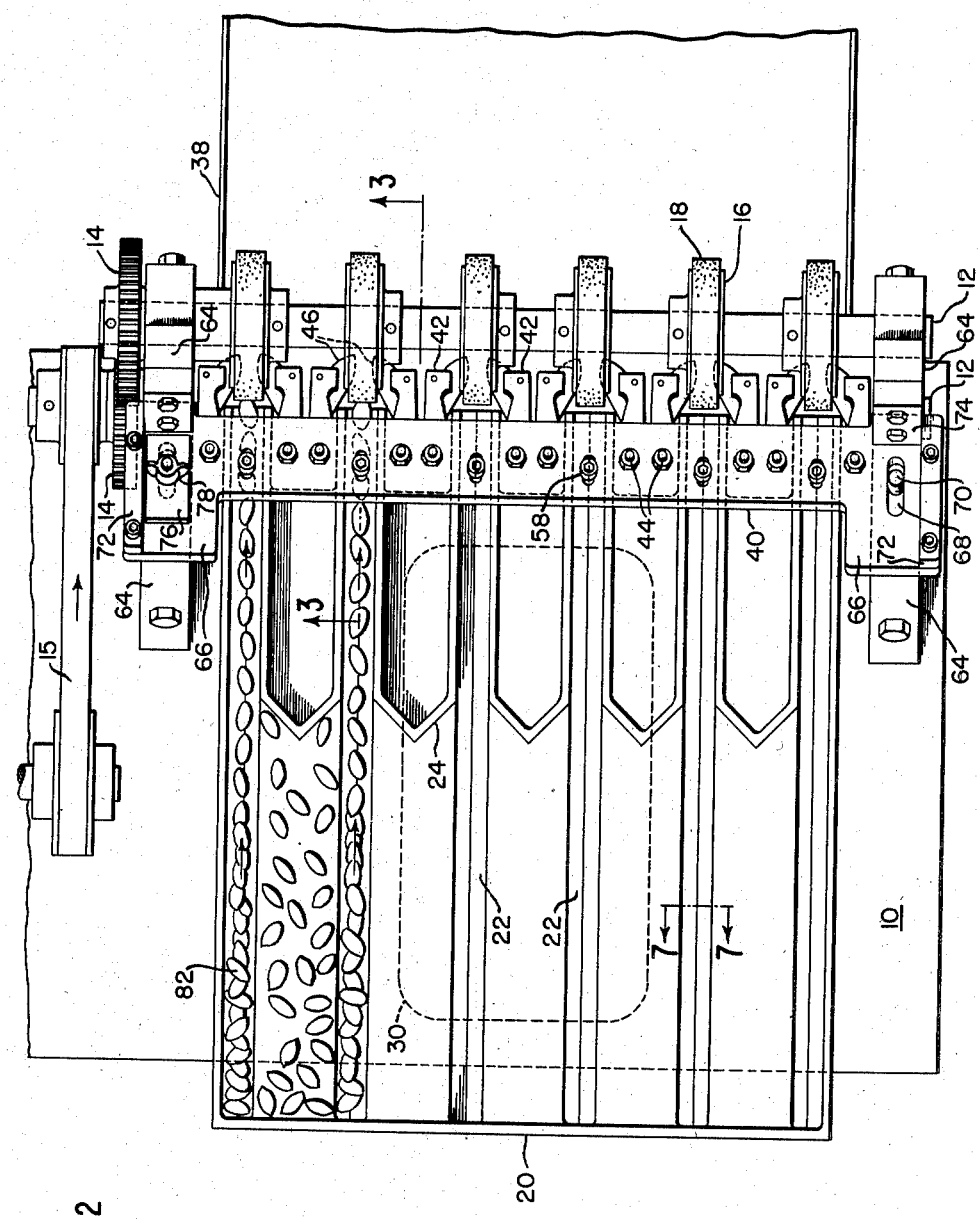
Fig. 2 is a plan view.

The bar 40 together with the arms 42 provides a demountable unit. Two triangular blocks 62 fixed to two inclined posts 64 of the frame are adapted to receive and support the two enlarged ends 66 of the bar. These end portions of the bar are slotted at 68 to receive upwardly extending bolts 70 carried by the blocks 62. The bar is guided and supported in proper position on the blocks by two members 72 bolted to the top faces of the bar portions 66 and cooperating with two blocks 74 bolted to the posts 64. When the bar 40 is placed in proper position on the blocks 62 (Fig. 2) flat abutment plates 76 are placed over the bolts 70 and wing nuts 78 are applied to secure the bar in place.

When the bar 40 is placed in operative position on the machine, the pairs of knives 46 are disposed in the gaps between the wheels 16 as indicated in Figs. 4 and 6. When working on peanuts it is desirable that the knives shall be slightly offset from the center of the gaps in order to preclude slitting and breaking some of the nuts into their two halves. As illustrated in Fig. 5 the knives are disposed slightly below the center and in Fig. 6 one knife is disposed below and the other above the center.

The nuts are poured into the forward end of the hopper 20 at 80 and longitudinal vibration of the hopper by the electromagnet disposes the nuts 82 into the troughs 22 and feeds them toward the wheels 16. The baffles 24 cause single rows of nuts arranged in end to end relation to pass to the wheels 16 which engage the nuts therebetween and pass them through the gaps between the wheels. The knives are arranged to engage and slit the skins on the nuts along lines extending substantially therearound from end to end of the nuts, the approaching movement of the knives being properly limited by adjustment of the blocks 56.

As illustrated in Fig. 3, one shaft 12 and its wheels 16 are disposed above and forwardly of the other shaft and wheels, and each V-shaped trough 22 extends forwardly toward its gap to and above the lower wheel but short of the gap and the other wheel. The trough feeds the nuts to the lower wheel which preferably has an annular channel therearound, like the channel 86 in Fig. 10, which aids in properly locating the nuts. At the gap the upper wheel engages the nuts which are thereupon gripped between and carried through the gap by the two wheels.

The knives 46 are disposed in the gap between the two wheels and perform the slitting operation while the nuts are supported by the wheels. Thus simultaneously supporting the nuts solely by and between the moving surfaces and slitting the skins eliminates any friction on the nuts which might disturb their position and cause jamming. Nut slitting machines heretofore known have employed fixed leaf springs for engaging and holding the nuts in contact with a moving conveyor during the slitting operation and this slight amount of friction has caused considerable jamming, breaking and scarring of the nuts. All such friction and jamming difficulties are eliminated in my improved machine and no breaking or scarring occurs in the product.

When working on almonds 83 the hopper troughs will be more sharply constructed as illustrated at 84 in Fig. 9, thereby arranging the nuts vertically and feeding them in that position to the wheels 16 which will also be annularly grooved at 86 as illustrated in Fig. 10.

Having thus disclosed my invention what I claim as new and desire to secure by Letters Patent is:

1. A machine for slitting the skins of nuts along lines extending substantially therearound, comprising a pair of parallel horizontal shafts disposed one above the other, a plurality of pairs of wheels respectively on the shafts, the wheels of each pair being in a common vertical plane and closely adjacent to each other and providing a narrow gap therebetween at their peripheries, a nut supporting hopper including a substantially horizontal plate having a plurality of V-shaped troughs extending forwardly toward and adjacent to the gaps, means for vibrating the hopper longitudinally of the troughs to arrange the nuts in end to end relation and feed them along the troughs to said wheels rearwardly of the gaps, resilient cushioning means at the peripheries of the wheels for gently engaging the nuts therebetween and passing them through the gaps, a pair of movably mounted members disposed at opposite sides of each gap, two blades detachably carried by the members in position to engage and cut the skins of nuts while they are supported and passed through each gap by the wheels, and resilient means normally moving the members and blades inwardly of the gaps, said blades having opposed cutting edges and said resilient means being adapted normally to force the edges toward each other to engage and cut the skin continuously substantially from the forward end of each nut at opposite sides to the rear end thereof as the wheels carry the nuts through the gaps.

2. A machine for slitting the skins of nuts, such as peanuts, comprising a pair of coplanar rotatable opposed rolls spaced to provide a narrow gap therebetween, at least one of said rolls having a resilient peripheral cushion, means for driving the rolls in opposite directions, and a pair of slitting knives in substantially parallel planes substantially normal to the plane of said rolls and having opposed cutting edges in said gap, at least one of said knives being resiliently mounted, said rolls being adapted to engage and move nuts through the gap and said cutting edges being adapted to engage each nut and slit the skin thereon and therealong at opposite sides as the rolls carry the nuts through the gap.

3. The machine defined in claim 2 plus means resiliently urging said knives and cutting edges toward each other.

4. The machine defined in claim 3 plus means for adjustably limiting the relative approaching movement of said cutting edges.

5. The machine defined in claim 2 in which each of said cutting edges is disposed to one side of the center of said gap.

References Cited in the file of this patent

UNITED STATES PATENTS

| Number | Name | Date |
|---|---|---|
| 326,026 | Fisher | Sept. 8, 1885 |
| 863,857 | Latchford | Aug. 20, 1907 |
| 1,138,300 | Letin et al. | May 4, 1915 |
| 1,176,095 | Rahne | Mar. 21, 1916 |
| 1,190,560 | Laganke | July 11, 1916 |
| 1,445,590 | Houck | Feb. 13, 1923 |
| 1,469,332 | Gotzhein | Oct. 2, 1923 |
| 2,246,843 | Drake | June 24, 1941 |
| 2,344,711 | McNutt et al. | Mar. 21, 1944 |
| 2,463,157 | Deitrickson | Mar. 1, 1949 |
| 2,558,899 | Green | July 3, 1951 |

FOREIGN PATENTS

| Number | Country | Date |
|---|---|---|
| 10,916 | Great Britain | 1888 |
| 63,396 | Austria | Feb. 10, 1914 |
| 457,391 | Germany | Mar. 14, 1928 |
| 361,383 | Italy | July 20, 1938 |